United States Patent [19]

Braat

[11] Patent Number: 5,016,994
[45] Date of Patent: May 21, 1991

[54] PROJECTION-LENS SYSTEM

[75] Inventor: Josephus J. M. Braat, Eindhoven, Netherlands

[73] Assignee: U.S. Philips Corporation, New York, N.Y.

[21] Appl. No.: 733,566

[22] Filed: May 13, 1985

[30] Foreign Application Priority Data

Feb. 18, 1985 [NL] Netherlands ............... 8500453

[51] Int. Cl.$^5$ ............................................. B29D 11/00
[52] U.S. Cl. ..................................... 350/432; 350/417
[58] Field of Search ................................ 350/432, 417

[56] References Cited

U.S. PATENT DOCUMENTS 3,917,766 11/1975 Howden ............................. 350/417
4,027,952 6/1977 Hughes .............................. 350/432
4,564,269 1/1986 Uehara .............................. 350/432

Primary Examiner—Paul M. Dzierzynski
Attorney, Agent, or Firm—Bernard Tiegerman

[57] ABSTRACT

A projection-lens system for projecting a magnified image of a scene formed by means of a reproduction element onto a projection screen, which system has two correction groups and one main group which provides substantially the entire power of the system. The main group includes a glass preform of which at least one of the outer surfaces is provided with a layer of a transparent plastics having an aspheric outer profile. This projection-lens system is substantially temperature-independent, provides a satisfactory correction for aberrations, and has a short focal length and a comparatively large numerical aperture.

9 Claims, 2 Drawing Sheets

PROJECTION-LENS SYSTEM

BACKGROUND OF THE INVENTION

The invention relates to a projection-lens system for projecting a magnified image of a scene reproduced by means of a reproduction element onto a projection screen. The lens system comprises, in this order and viewed from the image side, a first group of lenses, of which at least one outer surface is aspheric, a positive second or main group, of which at least the outer surface which faces the object side is aspheric, and a third group comprising a negative lens whose surface which faces the image side is concave and aspheric. The elements of the first group and the third group are made of a transparent plastic. The invention also relates to a colour-television projection system comprising at least one projection-lens system of this kind.

U.S. Pat. No. 4,348,081 discloses such a projection-lens system intended for projection a scene in one colour on a projection screen, where three monochrome images are super-imposed to form a colour picture, for example a colour-television picture. The third group comprises a planoconcave lens, also referred to as field-curvature correction lens or "field flattener", which compensates for the Petzval curvature of the two other lens groups. The main group may be a single biconvex lens or may comprise two spaced single positive lenses. The lens system is not achromatic. Moreover, in particular in the versions comprising three lenses, the modulation transfer function in the field corners is minimal and the luminance is not satisfactory.

In those versions of the projection-lens system in accordance with U.S. Pat. No. 4,348,081 in which the main group comprises at least one aspheric surface all the lens elements are transparent plastic. The entire projection-lens system is then comparatively light in weight but on account of the substantial temperature dependence of the refractive indices of the relevant the focal length of such a system will vary strongly with the temperature. U.S. Pat. No. 4,348,081 also described a system with a main group having one glass lens. This lens does not have any refractive surface with an aspheric profile, so that the projection-lens system does not provide a satisfactory correction for aberrations. Forming aspheric surfaces on glass lenses is time-consuming and expensive.

In the system comprising a glass main lens a part of the total power of the projection-lens system is provided by the first group and the third group, which are made of a transparent plastic whose refractive index varies with the temperature, so that the focal length of the entire system is still temperature dependent.

SUMMARY OF THE INVENTION

It is the object of the present invention to provide a projection-lens system whose focal length is substantially temperature-independent, which has a satisfactory modulation-transfer function over the entire field, which also provides an acceptable luminance in the corners, and which can be manufactured cheaply.

The main group provides substantially the entire power of the system and comprises at least one glass lens substrate, at least that outer surface of the substrate which faces the object side being provided with a layer of a transparent plastic having an aspheric outer profile.

The invention is based inter alia on the recognition of the fact that the temperature-independent high-quality main group with aspheric refractive surfaces required in a projection-lens system can be manufactured comparatively cheaply by the use of a glass preform or lens substrate which is provided with one or two layers of transparent plastic having aspheric outer profiles by means of a replica or copying method using dies having aspheric profiles. It is possible to design a projection-lens system having a small focal length and a large angle of field, which is the angle between the optical axis and the chief ray of a beam which issues from the edge of the object or scene and which is still accepted by the system.

When a projection-lens system with a large angle of field is used in a projection system, for example a colour-television projection system, this system can be compact, which is a substantial practical advantage.

The main group may have a cemented doublet of a biconvex lens and a concave-convex lens, whose lens substrates have substantially equal refractice indices and different dispersions. This system has the advantage that the axial chromatic abberration is substantially smaller than in the projection-lens systems known until now. The axial chromatic aberration is to be understood to mean the variation in the axial position of the image as a function of the wavelength of the radiation used.

An important practical aspect of the projection-lens system is that it is possible to design the system so that the diameter of the lens elements decreases viewed from the object side. As in a colour-television projection system the monochrome images should be superimposed on the projection screen, the reproduction tubes, which are arranged in-line, should be inclined towards one another, i.e. the normals to the two outer reproduction tubes should make a specific angle with the normal to the inner reproduction tube. If the diameters of the lens elements decrease towards the image side, i.e. in the case that the projection lens system is trough-shaped, this angle can be smaller than in conventional projection-lens systems Reducing this angle is favourable in view of the optical properties of the projection screen.

If the two outer surfaces of the main group are provided with an aspheric layer of a transparent plastic, the lens system exhibits very good properties. Surprisingly, it has been found that it is possible to obtain practically the same good properties if only one of the outer surfaces of the main group is provided with an aspheric layer.

The third group may have two lenses, of which the lens at the image side is a meniscus lens whose concave surface faces the image side and of which the second lens is a planoconcave lens whose concave surface faces the image side, and the concave surfaces of both lens are aspheric.

Preferably the third group comprises one meniscus lens whose power is substantially zero and whose convex surface faces the image side.

DESCRIPTION OF THE PREFERRED EMBODIMENTS

Figure 1:
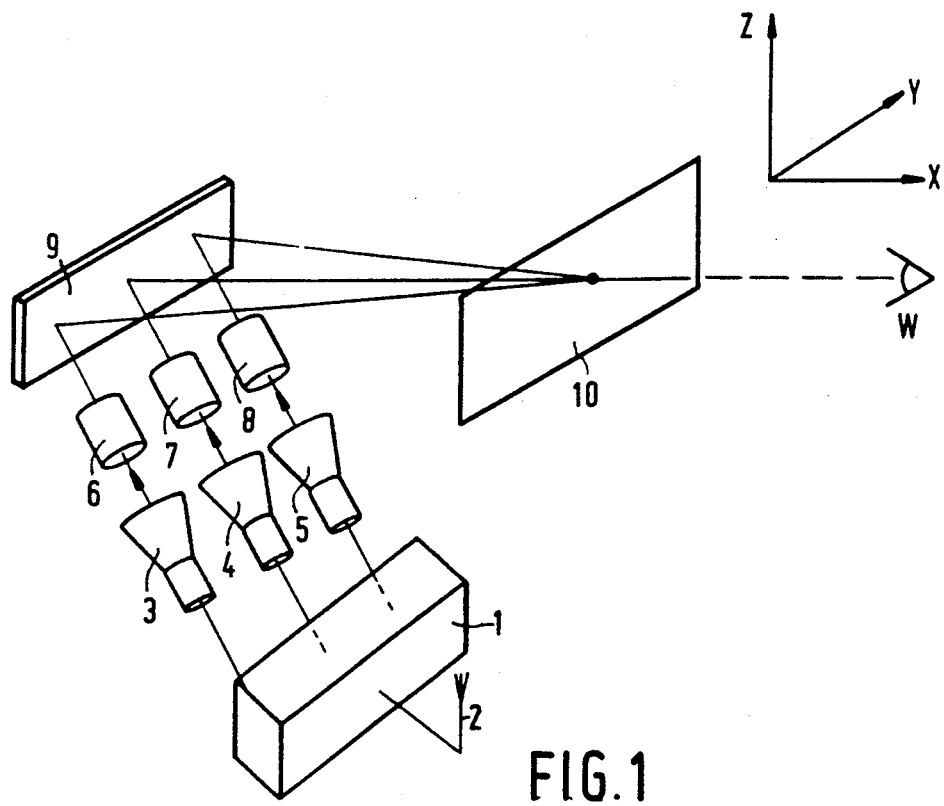
FIG. 1 is a schematic perspective view of a colour-television projection system.

The colour-television projection system shown in FIG. 1 comprises a colour television receiver 1. An input of this receiver, which is coupled to an aerial 2, receives a colour television signal which is divided into a red signal, a green signal and a blue signal. These signals are applied to three separate reproduction tubes, in the present example three cathode-ray tubes 3, 4 and 5, on whose fluorescent screens a red picture, a green picture and a blue picture appear. The schematically shown projection-lens systems 6, 7 and 8 associated with the reproduction tubes project these pictures onto a projection screen 10. For the sake of clarity only the chief rays of the beams emitted by the reproduction tubes are shown. A mirror 9 is arranged between the projection-lens systems and the projection screen and reflects the upwardly inclined beams from the cathode-ray tubes to the projection screen. This mirror folds the radiation path, so that the projection system can be accommodated in a small cabinet without reducing the length of the radiation path.

The three monochrome pictures must be superimposed on the projection screen. For this purpose the reproduction tubes, which are arranged in-line, are slightly inclined towards one another, i.e. the normals to the screens of the tubes 3 and 5 make a small angle with the normal to the screen of the tube 4.

In the projection screen 10 the radiation of the three beams is scattered over a comparatively large angle in the Y-direction, which is the horizontal direction for the viewer W, and over a smaller angle in the Z direction, which is the vertical direction for the viewer. The viewer W sees a picture which is a superposition of the enlarged images formed by means of the reproduction tubes.

Each of the projection lenses 3, 4, and 5 should image the scene on the screen of the associated reproduction tube on the projection screen with a high image quality, also at the edges of the picture. Such a projection-lens system should have a large numerical aperture and the image distance corresponding to a specific magnification should be as small as possible. The lenses of the projection-lens system are comparatively large, so that it is desirable to make these lenses of light-weight materials. Further, the number of lens elements should be minimal, so that at least some of these elements must have aspheric refractive surfaces in order to ensure that the projection-lens system is adequately corrected and has a satisfactory optical transfer function. Moreover, the focal length of the entire projection-lens system should be temperature-independent and should remain constant within a wider range of wavelengths.

The present invention provides a class of projection-lens systems by means of which these partly conflicting requirements are met in an optimum manner.

Figure 2:
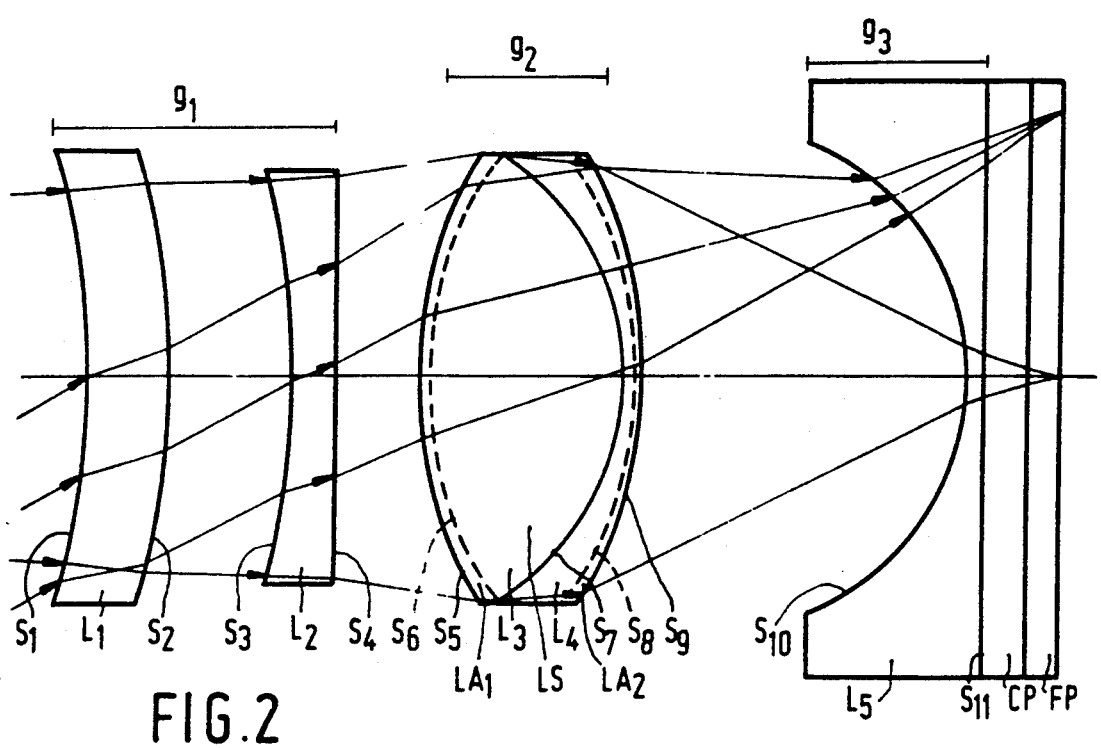
FIGS. 2, 3 and 4 show embodiments of the projection-lens system for use in the colour-television projection system.

FIG. 2 shows a projection-lens system in accordance with a first embodiment of the invention. Viewed from the image side, or the projection screen which is thought to be situated to the left of FIG. 2, this system comprises a first or correction group $g_1$, a main group $g_2$ and a third or field-curvature-correction group $g_3$. The last-mentioned group has a single lens $L_5$ which has a concave refractive surface $S_{10}$ with an aspheric profile and which is made of a transparent plastic such as polymethyl methacrylate (PMMA). The second surface $S_{11}$ of the lens $L_5$ is plane and is positioned against a flat holder CP. A cooling liquid such as water and glycol flows through this holder, because without cooling the temperature of the fluorescent material on the faceplate FP of the tube would rise substantially, as a result of which the brightness of the tube could decrease.

The first lens group $g_1$ comprises two correction lenses $L_1$ and $L_2$ with surfaces $S_1$, $S_2$ and $S_3$, $S_4$, respectively. The surfaces $S_1$ and $S_3$ are concave and have aspheric profiles. The surface $S_2$ of the lens $L_1$ is convex and has a spheric profile and the surface $S_4$ of the lens $L_2$ is plane. The lenses $L_1$ and $L_2$ are made of a transparent plastic such as PMMA. Instead of PMMA the groups $g_1$ and $g_3$ may be made of, polycarbonate.

The main group $g_2$, which provides substantially the entire optical power of the lens system and which in principle may comprise a signal lens, should comply with more stringent requirements than the correction lenses $L_1$, $L_2$ and $L_5$. The focal length of the main lens should be substantially independent of temperature variations in order to ensure that the focal length of the entire projection system remains constant in the case of temperature variations and the image formed on the projection screen remains in focus. This lens comprises two aspheric refractive surfaces $S_5$ and $S_9$. The main lens comprises a glass lens substrate LS having two convex surfaces $S_6$ and $S_8$, represented by broken lines in FIG. 2, which are each provided with transparent plastic layers $LA_1$ and $LA_2$, respectively with aspheric outer profiles $S_5$ and $S_9$, respectively. Almost the entire power of the main lens is provided by the glass body LS of high optical quality and good thermal stability. The aspheric plastic layers are thin and a variation in the shape or refractive index of these layers as a result of temperature variations has only a minimal effect on the behaviour of the entire lens.

The aspheric layers can be applied to the lens substrate LS by means of a replica process. For this process use is made of dies with inner profiles which are negatives of the desired outer profiles of the layers to be formed. A transparent plastic in a sufficiently soft condition, for example an ultraviolet-polymerisable plastics, is deposited on the lens substrate, after which the dies are pressed into this material. Subsequently, the plastic is cured by exposure to ultraviolet light and the dies are removed, so that the lens is formed without any further operations.

The main group $g_2$ may have two lens elements $L_3$ and $L_4$ which are cemented to each other and which have surfaces $S_5$, $S_7$ and $S_7$, $S_9$, respectively, as is shown in FIG. 2. The refractive indices of the materials of which these lens elements are made are equal as far as possible and the dispersions are unequal. Such a doublet provides a satisfactory correction for axial chromatic aberrations. Each of the lenses $L_3$ and $L_4$ is a glass lens substrate having one side provided with an aspheric layer $LA_1$ and $LA_2$, respectively.

In an embodiment as shown in FIG. 2 the projection lens system may have a numerical aperture of 0.375 and a focal length of 94 mm.

Figure 3:
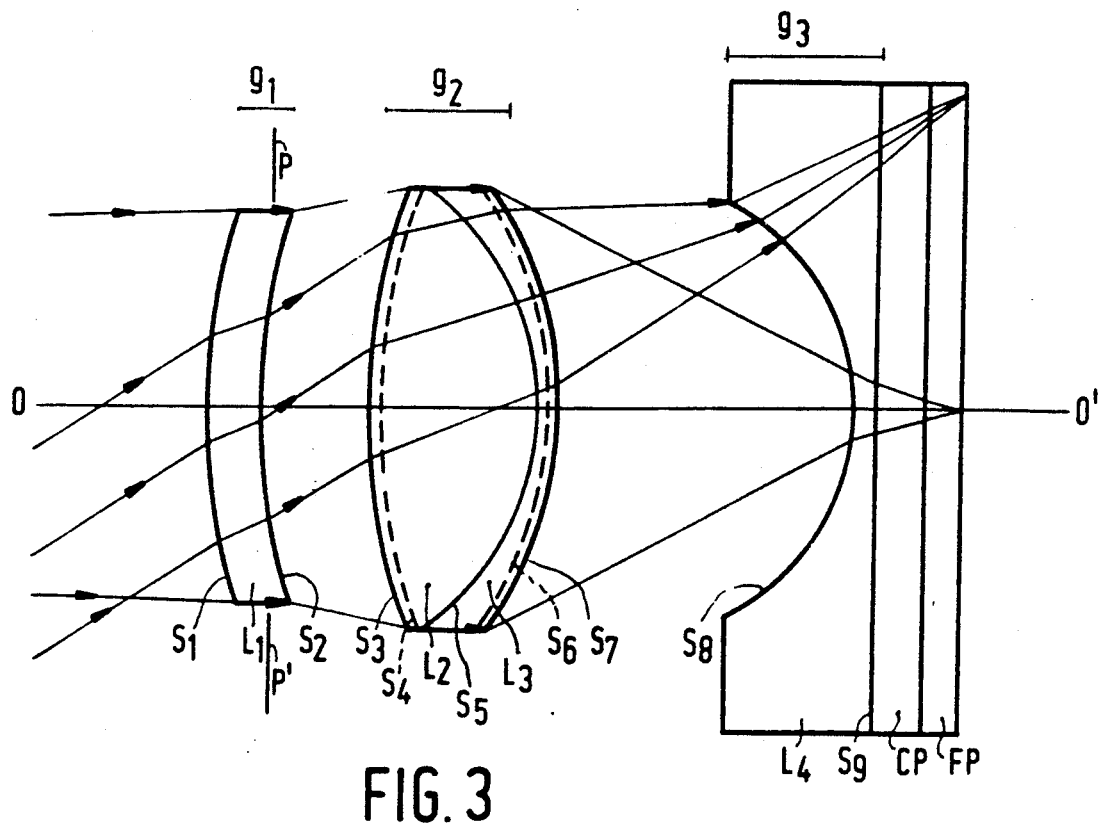
Figure 4:
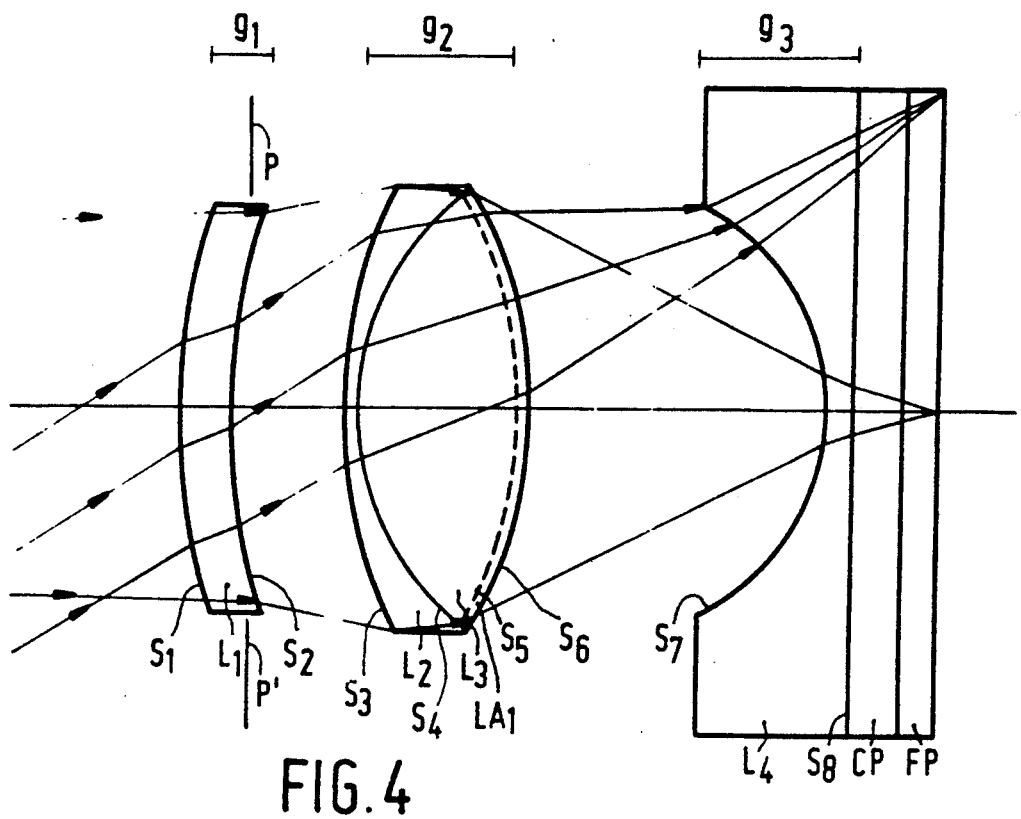

In FIGS. 2, 3 and 4 the image side is situated to the left of the drawing. Although in practice the rays propagate from right to left, the radiation path is shown from right to left in FIGS. 2, 3 and 4, which is permissible for this type of optical system.

FIG. 3 shows a second embodiment of the projection lens system having a larger numeral aperture, for example N.A = 0.385, and a smaller focal length, for example F = 85 mm, and consequently a shorter length of the system, whilst the correction group $g_1$ comprises only one lens $L_1$. In practice, the theoretically anticipated reduction in the quality of the projection-lens system shown in FIG. 3 in comparison with that shown in FIG. 2 is hardly perceptible inter alia owing to inevitable manufacturing tolerances. The lens $L_1$ has a convex surface $S_1$ with an aspheric profile and a spherical concave surface $S_2$ and may be made of PMMA. The main group comprises a doublet, the lenses $L_2$ and $L_3$, with convex aspheric outer surfaces $S_3$ and $S_7$ and a common spherical inner surface $S_5$. Each of the lenses $L_2$ and $L_3$ may comprise a glass lens substrate with an aspheric plastic layer. The field-correction lens $L_4$ has an aspheric concave surface $S_8$ and a plane surface $S_9$ and may be made of PMMA.

The aspheric surfaces $S_1$, $S_3$, $S_7$ and $S_8$ may be characterized by:

$$Z = \sum_{i=1}^{6} a_{2i} \cdot Y^{2i}$$

where Y is the distance from a point on the aspheric surface to the optical axis of the lens and Z is the distance between the projection of this point on the optical axis and the intersection of the optical axis with the aspheric surface.

For an embodiment of the projection-lens system as shown in FIG. 2, in which the lenses $L_1$ and $L_4$ are made of PMMA, the lens $L_2$ is made of glass of the type "Schott SK5" and the lens $L_3$ is made of glass of the type "Schott F2", the axial surface survature C, the axial distances d between these surfaces and the refractive indices n have the following values, viewed from the image (left) side:

|  |  | $C(mm^{-1})$ | $d(mm.)$ | n |
|---|---|---|---|---|
| $L_1$ | $S_1$ | 0.010969 | | |
| | | | 10 | 1.490 |
| | $S_2$ | 0.008893 | | |
| | | | 21.90 | |
| $LA_1$ | $S_3$ | 0.009099 | | |
| | | | 0.04 | 1.570 |
| | $S_4$ | 0.008778 | | |
| $L_2$ | | | 33.00 | 1.592 |
| | $S_5$ | −0.019500 | | |
| $L_3$ | | | 3.40 | 1.625 |
| | $S_6$ | −0.012832 | | |
| $LA_2$ | | | 0.17 | 1.570 |
| | $S_7$ | −0.013464 | | |
| | | | 60.14 | |
| | $S_8$ | −0.023934 | | |
| $L_4$ | | | 3.00 | 1.490 |
| | $S_9$ | 0.000000 | | | whislt the aspheric coefficients $a_{2i}$ of the surfaces $S_1$, $S_3$, $S_7$ and $S_8$ are as follows:

| | |
|---|---|
| $S_1$: | $a_2 = 0.548463 \cdot 10^{-2}$ |
| | $a_4 = -0.109378 \cdot 10^{-5}$ |
| | $a_6 = 0.538097 \cdot 10^{-9}$ |
| | $a_8 = -0.852732 \cdot 10^{-12}$ |
| | $a_{10} = 0.351637 \cdot 10^{-15}$ |
| | $a_{12} = -0.705982 \cdot 10^{-19}$ |
| $S_3$: | $a_2 = 0.454975 \cdot 10^{-2}$ |
| | $a_4 = 0.289795 \cdot 10^{-6}$ |
| | $a_6 = 0.586785 \cdot 10^{-9}$ |
| | $a_8 = -0.523290 \cdot 10^{-12}$ |
| | $a_{10} = 0.218841 \cdot 10^{-15}$ |
| | $a_{12} = -0.330159 \cdot 10^{-19}$ |
| $S_7$: | $a_2 = -0.673193 \cdot 10^{-2}$ |
| | $a_4 = -0.848738 \cdot 10^{-7}$ |

-continued

| | |
|---|---|
| | $a_6 = -0.407030 \cdot 10^{-10}$ |
| | $a_8 = -0.134318 \cdot 10^{-13}$ |
| | $a_{10} = 0.354263 \cdot 10^{-17}$ |
| | $a_{12} = 0.284704 \cdot 10^{-20}$ |
| $S_8$: | $a_2 = -0.119668 \cdot 10^{-1}$ |
| | $a_4 = 0.290482 \cdot 10^{-5}$ |
| | $a_6 = 0.357137 \cdot 10^{-9}$ |
| | $a_8 = 0.172751 \cdot 10^{-12}$ |
| | $a_{10} = -0.319063 \cdot 10^{-15}$ |
| | $a_{12} = 0.610782 \cdot 10^{-19}$ |

FIG. 4 shows another embodiment of the projection-lens system. For the same focal length and numerical aperture this system has one aspheric surface less than the system shown in FIG. 3, which is advantageous for reasons of production engineering. In the main group $g_2$ the biconvex lens and the concave-convex lens have been interchanged in comparison with the main group shown in FIG. 3. In the projection lens system shown in FIG. 4 only the lens with the smallest refractive index, namely the lens $L_3$, which is for example made of "SK5" glass, has a layer $LA_1$ with an aspheric outer surface $S_5$. The lens $L_2$ of, for example, "F2" glass has a spherical outer surface $S_3$.

An embodiment of the projection-lens system as shown in FIG. 4 has the following values for the surface curvature C, the axial distances d, and the refractive indices n:

|  |  | $C(mm^{-1})$ | $d(mm.)$ | n |
|---|---|---|---|---|
| $L_1$ | $S_1$ | 0.009746 | | |
| | | | 10 | 1.490 |
| | $S_2$ | 0.008630 | | |
| | | | 21.08 | |
| $L_2$ | $S_3$ | 0.010194 | | |
| | | | 3 | 1.625 |
| | $S_4$ | 0.019000 | | |
| $L_3$ | | | 33.40 | 1.592 |
| | $S_5$ | −0.012100 | | |
| $LA_1$ | | | 0.22 | 1.570 |
| | $S_6$ | −0.013016 | | |
| | | | 60.93 | |
| $L_4$ | $S_7$ | −0.023230 | | |
| | | | 3.00 | 1.49 |
| | $S_8$ | 0.000000 | | | whilst the coefficients $a_{2i}$ of the aspheric surfaces $S_1$, $S_6$ and $S_7$ are as follows:

| | |
|---|---|
| $S_1$: | $a_2 = 0.487302 \cdot 10^{-2}$ |
| | $a_4 = -0.132602 \cdot 10^{-5}$ |
| | $a_6 = 0.893281 \cdot 10^{-9}$ |
| | $a_8 = -0.125369 \cdot 10^{-11}$ |
| | $a_{10} = 0.575593 \cdot 10^{-15}$ |
| | $a_{12} = -0.112343 \cdot 10^{-18}$ |
| $S_6$: | $a_2 = -0.650812 \cdot 10^{-2}$ |
| | $a_4 = 0.753203 \cdot 10^{-7}$ |
| | $a_6 = -0.112248 \cdot 10^{-9}$ |
| | $a_8 = 0.440464 \cdot 10^{-13}$ |
| | $a_{10} = -0.740770 \cdot 10^{-17}$ |
| | $a_{12} = 0.140561 \cdot 10^{-20}$ |
| $S_7$: | $a_2 = -0.116152 \cdot 10^{-1}$ |
| | $a_4 = -0.358740 \cdot 10^{-5}$ |
| | $a_6 = 0.613170 \cdot 10^{-9}$ |
| | $a_8 = 0.114572 \cdot 10^{-12}$ |
| | $a_{10} = -0.326357 \cdot 10^{-15}$ |
| | $a_{12} = 0.436284 \cdot 10^{-19}$ |

The projection-lens system described here is very suitable for use in the green channel, having the widest band, in a colour television-projection system. However, such projection-lens systems may also be used in the blue channel and the red channel of such a colour-television projection system.

What is claimed is:

1. A projection-lens system for projecting a magnified image of a scene reproduced by means of a reproduction element into a projection screen, which lens system comprises, in this order and from the image side, a first group, of which at least one outer surface is aspheric, a positive second or main group, of which at least the outer surface which faces the object side is aspheric, and a third group comprising a negative lens whose surface which faces the image side is concave and aspheric, the elements of the first group and the third group being made of transparent plastic, characterized in that the main group provides substantially the entire power of the system and comprises a glass lens substrate, the outer surface of said substrate which faces the object side being provided with a layer of a transparent plastic having an aspheric outer profile, said layer having a thickness which is substantially smaller than that of the glass lens substrate, said layer having negligible refractive power.

2. A projection-lens system as claimed in claim 1, characterized in that the main group comprises a cemented doublet of a biconvex lens and a concave-convex lens, whose lens substrates have substantially equal refractive indices and different dispersions.

3. A projection-lens system as claimed in claim 2, characterized in that the third group comprises one meniscus lens whose power is substantially zero and whose concave surface faces the image side.

4. A projection-lens system as claimed in claim 3, characterized in that, viewed from the image side, the axial curvatures C of the lens surfaces, the axial distances d between these surfaces, and the refractive indices n of the lens materials have the following values

|  |  | C(mm$^{-1}$) | d(mm.) | n |
|---|---|---|---|---|
| L$_1$ | S$_1$ | 0.009746 |  |  |
|  |  |  | 10 | 1.490 |
|  | S$_2$ | 0.008630 |  |  |
|  |  |  | 21.08 |  |
| L$_2$ | S$_3$ | 0.010194 |  |  |
|  |  |  | 3 | 1.625 |
|  | S$_4$ | 0.019000 |  |  |
| L$_3$ |  |  | 33.40 | 1.592 |
|  | S$_5$ | −0.012100 |  |  |
| LA$_1$ |  |  | 0.22 | 1.570 |
|  | S$_6$ | −0.013016 |  |  |
|  |  |  | 60.93 |  |
|  | S$_7$ | −0.023230 |  |  |
| L$_4$ |  |  | 3.00 | 1.49 |
|  | S$_8$ | 0.000000 |  |  | the focal length F=85 mm and the numerical aperture N.A.=0.385, and the coefficients $a_{2i}$ of the aspheric surfaces S$_1$, S$_5$ and S$_6$ which are characterized by:

$$Z = \sum_{i=1}^{6} a_{2i} \cdot Y^{2i}$$

where Y is the distance from a point on the shperic surface to the optical axis of the lens and Z is the difference between the projection of this point on the optical axis and the intersection of the optical axis with the aspheric surface, comply with:

| S$_1$: | $a_2 = 0.548463 \cdot 10^{-2}$ |
|---|---|
|  | $a_4 = -0.109378 \cdot 10^{-5}$ |
|  | $a_6 = 0.538097 \cdot 10^{-9}$ |
|  | $a_8 = -0.852732 \cdot 10^{-12}$ |
|  | $a_{10} = 0.351637 \cdot 10^{-15}$ |
|  | $a_{12} = -0.705982 \cdot 10^{-19}$ |
| S$_6$: | $a_2 = 0.487302 \cdot 10^{-2}$ |
|  | $a_4 = -0.132602 \cdot 10^{-5}$ |
|  | $a_6 = 0.893281 \cdot 10^{-9}$ |
|  | $a_8 = -0.125369 \cdot 10^{-11}$ |
|  | $a_{10} = 0.575593 \cdot 10^{-15}$ |
|  | $a_{12} = -0.112343 \cdot 10^{-18}$ |
| S$_6$: | $a_2 = -0.650812 \cdot 10^{-2}$ |
|  | $a_4 = 0.753203 \cdot 10^{-7}$ |
|  | $a_6 = -0.112248 \cdot 10^{-9}$ |
|  | $a_8 = 0.440464 \cdot 10^{-13}$ |
|  | $a_{10} = -0.740770 \cdot 10^{-17}$ |
|  | $a_{12} = 0.140561 \cdot 10^{-20}$ |
| S$_7$: | $a_2 = -0.116152 \cdot 10^{-1}$ |
|  | $a_4 = -0.358740 \cdot 10^{-5}$ |
|  | $a_6 = 0.613170 \cdot 10^{-9}$ |
|  | $a_8 = 0.114572 \cdot 10^{-12}$ |
|  | $a_{10} = -0.326357 \cdot 10^{-15}$ |
|  | $a_{12} = 0.436284 \cdot 10^{-19}$ |

5. A projection-lens system as claimed in claim 1, or 2, characterized in that each of the outer surfaces of the main group is provided with a layer of a tranparent plastics having an aspheric outer profile.

6. A projection-lens system as claimed in claim 5, characterized in that the third group comprises one meniscus length whose power is substantially zero and whose convex aspheric surface faces the image side.

7. A projection-lens system as claimed in claim 6, characterized in that, viewed from the image side, the axial curvatures C of the lens surfaces, the axial distances d between the surfaces and the refractive indices n of the lens material have the following values:

|  |  | C(mm$^{-1}$) | d(mm.) | n |
|---|---|---|---|---|
| L$_1$ | S$_1$ | 0.010969 |  |  |
|  |  |  | 10 | 1.490 |
|  | S$_2$ | 0.008893 |  |  |
|  |  |  | 21.90 |  |
|  | S$_3$ | 0.009099 |  |  |
| LA$_1$ |  |  | 0.04 | 1.570 |
|  | S$_4$ | 0.008778 |  |  |
| L$_2$ |  |  | 33.00 | 1.592 |
|  | S$_5$ | −0.019500 |  |  |
| L$_3$ |  |  | 3.40 | 1.625 |
|  | S$_6$ | −0.012832 |  |  |
| LA$_2$ |  |  | 0.17 | 1.570 |
|  | S$_7$ | −0.013464 |  |  |
|  |  |  | 60.14 |  |
|  | S$_8$ | −0.023934 |  |  |
| L$_4$ |  |  | 3.00 | 1.490 |
|  | S$_9$ | 0.000000 |  |  | the focal length F=85 mm and the numerical aperture N.A.=0.385, and the coefficients $a_{2i}$ of the aspheric surfaces S$_1$, S$_3$, S$_7$ and S$_8$ which are characterized by:

$$Z = \sum_{i=1}^{6} a_{2i} \cdot Y^{2i}$$

where Y is the distance from a point of the aspheric surface to the optical axis of the lens and Z is the distance between the projection of this point on the optical axis and the intersection of the optical axis with the aspheric surface, comply with:

| S$_1$: | $a_2 = 0.548463 \cdot 10^{-2}$ |
|---|---|
|  | $a_4 = -0.109378 \cdot 10^{-5}$ |
|  | $a_6 = 0.538097 \cdot 10^{-9}$ |
|  | $a_8 = -0.852732 \cdot 10^{-12}$ |
|  | $a_{10} = 0.351637 \cdot 10^{-15}$ |
|  | $a_{12} = -0.705982 \cdot 10^{-19}$ |

-continued

| | |
|---|---|
| $S_3$: | $a_2 = 0.454975 \cdot 10^{-2}$ |
| | $a_4 = 0.289795 \cdot 10^{-6}$ |
| | $a_6 = 0.586785 \cdot 10^{-9}$ |
| | $a_8 = -0.523290 \cdot 10^{-12}$ |
| | $a_{10} = 0.218841 \cdot 10^{-15}$ |
| | $a_{12} = -0.330159 \cdot 10^{-19}$ |
| $S_7$: | $a_2 = -0.673193 \cdot 10^{-2}$ |
| | $a_4 = -0.848738 \cdot 10^{-7}$ |
| | $a_6 = -0.407030 \cdot 10^{-10}$ |
| | $a_8 = -0.134318 \cdot 10^{-13}$ |
| | $a_{10} = 0.354263 \cdot 10^{-17}$ |
| | $a_{12} = 0.284704 \cdot 10^{-20}$ |
| $S_8$: | $a_2 = -0.119668 \cdot 10^{-1}$ |
| | $a_4 = 0.290482 \cdot 10^{-5}$ |
| | $a_6 = 0.357137 \cdot 10^{-9}$ |
| | $a_8 = 0.172751 \cdot 10^{-12}$ |
| | $a_{10} = -0.319063 \cdot 10^{-15}$ |

-continued $a_{12} = 0.610782 \cdot 10^{-19}$.

8. A projection-lens system as claimed in claim 5, characterized in that the third group comprises two lenses, of which the lens at the image side is a meniscus lens whose concave surface faces the image side and of which the second lens is a planoconcave lens whose concave surface faces the image side, and the concave surfaces of both lenses are aspheric.

9. A colour-television projection system comprising three cathode-ray tubes, one for each of the primary colours red, green and blue, a projection screen, and three projection-lens systems, which are each arranged between one of the cathode-ray tubes and the projection screen, characterized in that at least the projection-lens system in the radiation path from the green cathode-ray tube is a projection-lens system as claimed in claim 1, 2, 3, 8, or 9.

* * * * *